United States Patent
Makino et al.

(10) Patent No.: US 8,580,026 B2
(45) Date of Patent: Nov. 12, 2013

(54) PRECURSOR SOL OF ALUMINUM OXIDE, OPTICAL MEMBER, AND METHOD FOR PRODUCING OPTICAL MEMBER

(75) Inventors: Kenji Makino, Tokyo (JP); Tomonari Nakayama, Yokohama (JP); Keiko Abe, Kawasaki (JP); Norishige Kakegawa, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 316 days.

(21) Appl. No.: 13/101,927

(22) Filed: May 5, 2011

(65) Prior Publication Data
US 2011/0274878 A1 Nov. 10, 2011

(30) Foreign Application Priority Data

May 7, 2010 (JP) ................................ 2010-107704
Mar. 11, 2011 (JP) ................................ 2011-054420

(51) Int. Cl.
B05D 5/06 (2006.01)
C03C 17/25 (2006.01)
C03C 17/28 (2006.01)
C09D 5/00 (2006.01)

(52) U.S. Cl.
CPC ............... *C09D 5/006* (2013.01); *C03C 17/25* (2013.01); *C03C 17/28* (2013.01); *C03C 2217/73* (2013.01); *C03C 2217/732* (2013.01); *B05D 5/063* (2013.01); *B05D 2401/10* (2013.01); *B05D 2203/35* (2013.01)
USPC ....... 106/287.17; 427/162; 427/164; 427/273

(58) Field of Classification Search
USPC ...................... 106/287.17; 427/162, 164, 273
See application file for complete search history.

(56) References Cited

U.S. PATENT DOCUMENTS

| | | | | |
|---|---|---|---|---|
| 4,013,465 | A | * 3/1977 | Clapham et al. | ................. 430/11 |
| 4,202,870 | A | 5/1980 | Caglinoe et al. | |
| 4,579,594 | A | * 4/1986 | Nanao et al. | ............. 106/287.24 |
| 4,610,866 | A | 9/1986 | Debsikdar et al. | |
| 5,110,392 | A | * 5/1992 | Ito et al. | ......... 156/314 |
| 5,133,918 | A | 7/1992 | Jung et al. | |
| 5,454,861 | A | * 10/1995 | Hasegawa et al. | ................. 106/2 |
| 2008/0310026 | A1 | * 12/2008 | Nakayama et al. | ........... 359/586 |

FOREIGN PATENT DOCUMENTS

| | | |
|---|---|---|
| EP | 1022587 A1 | 7/2000 |
| EP | 1574881 A1 | 9/2005 |
| EP | 1693689 A1 | 8/2006 |
| EP | 1947486 A1 | 7/2008 |
| EP | 2000289 A2 | 12/2008 |
| EP | 2236462 A2 | 10/2010 |
| EP | 2237078 A2 | 10/2010 |
| JP | 50-70040 A | 6/1975 |
| JP | 55-149124 A | 11/1980 |
| JP | 02-141417 A | 5/1990 |
| JP | 07-267633 A | 10/1995 |
| JP | 9-202649 A | 8/1997 |
| JP | 2006-171430 A | 6/2006 |
| JP | 3975612 B2 | 9/2007 |
| JP | 4247354 B2 | 4/2009 |
| JP | 4528896 B2 | 8/2010 |
| JP | 2011-028277 A | 2/2011 |
| WO | 2008-102902 A1 | 8/2008 |
| WO | 2011-048794 A2 | 4/2011 |

* cited by examiner

*Primary Examiner* — David M Brunsman
(74) *Attorney, Agent, or Firm* — Canon U.S.A., Inc., IP Division

(57) ABSTRACT

A precursor sol of aluminum oxide contains a polycondensate formed by the hydrolysis of an aluminum alkoxide or an aluminum salt, a solvent, and an organic aluminum compound of general formula (1):

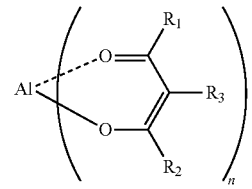

wherein R1 and R2 each represent an alkyl group having 1 to 6 carbon atoms, a perfluoroalkyl group, or an allyl group; R3 represents an alkyl group having 1 to 6 carbon atoms, a perfluoroalkyl group, an allyl group, or an aryl group; and n represents an integer of 1 to 3. An optical member is produced by a process including a step of immersing an aluminum oxide film in a hot water with a temperature of 60 Â° C. to 100 Â°C. to form a textured structure made of aluminum oxide crystals, the aluminum oxide film being formed by feeding the precursor sol of aluminum oxide onto a base. A method for producing an optical member includes a step of immersing an aluminum oxide film in a hot water with a temperature of 60 Â° C. to 100 Â° C. to form a textured structure made of aluminum oxide crystals, the aluminum oxide film being formed by feeding the precursor sol of aluminum oxide onto a base.

4 Claims, 7 Drawing Sheets

PRECURSOR SOL OF ALUMINUM OXIDE, OPTICAL MEMBER, AND METHOD FOR PRODUCING OPTICAL MEMBER

BACKGROUND OF THE INVENTION

1. Field of the Invention

The present invention relates to a precursor sol of aluminum oxide, the precursor sol of aluminum oxide having satisfactory coating properties and being capable of providing satisfactory antireflection performance in a wide range including a visible region when the precursor sol of aluminum oxide is subjected to baking treatment even at a low temperature, and relates to an optical member and a method for producing an optical member using the precursor sol of aluminum oxide.

2. Description of the Related Art

An antireflective structure with a microstructure which is equal to or smaller than a wavelength in the visible region and which has an appropriate pitch and height is known to provide excellent antireflection performance in a wide wavelength range. It is known that a method for producing the microstructure includes, for example, forming a film by application in such a manner that fine particles each having a particle size of the wavelength or less are dispersed in the film.

It is known that the employment of a method for producing a microstructure by patterning with a microprocessing apparatus, for example, an electron beam lithography apparatus, a laser interference exposure apparatus, a semiconductor exposure apparatus, or an etching apparatus, enables us to control the pitch and height of the microstructure, resulting in a microstructure having excellent antireflection performance (for example, see Japanese Patent Laid-Open No. 50-70040).

An example of other known methods is a method in which boehmite, which is an aluminum hydroxide oxide, is grown on a base to provide antireflection performance. In these methods, an aluminum oxide (alumina) film formed by a vacuum film-formation method or a liquid-phase method (sol-gel method) is subjected to steam treatment or hot-water immersion treatment to turn the surface layer of the film into boehmite, thereby forming an antireflection coating film (for example, see Japanese Patent Laid-Open No. 9-202649).

It is known that in the method for forming an antireflection coating film with a microstructure composed of boehmite, the resulting film has extremely low normal-incidence reflectivity and oblique-incidence reflectivity and provides excellent antireflection performance.

However, in the case where a sol in which an organic aluminum compound is easily aggregated is applied on a member to form a film, the film can have a low degree of uniformity, leading to poor appearance due to the nonuniformity of the film.

In the case of employing a wet process, for example, a liquid-phase method (sol-gel method), the baking temperature during film formation is usually as high as 200° C. or higher (for example, see Japanese Patent Laid-Open No. 9-202649). This causes problems in which peripheral members and the figure tolerance of an optical member are adversely affected and in which a film cannot be formed on a base, such as a resin base, which does not withstand high temperatures. A sol configured to form an aluminum oxide film by a liquid-phase method (sol-gel method) contains a stabilizer to prevent clouding of the film due to rapid hydrolysis of an aluminum alkoxide by water in air or the addition of water. Typical examples of the stabilizer that can be used include β-ketoester compounds, β-diketone compounds, and alkanolamines.

The stabilizer can be chelated with aluminum to form an organic aluminum compound, causing aggregation. The resulting organic aluminum compound can have a high melting point or sublimation point. So, if baking is performed at a temperature lower than 200° C., the organic aluminum compound remains in the resulting aluminum oxide film. Furthermore, it is speculated that the aggregation of the organic aluminum compound inhibits bonding formation between particles by the hydrolysis of the aluminum alkoxide in an optical film during baking. If the bonding formation between particles is not sufficient, a textured structure composed of aluminum oxide boehmite is not sufficiently formed, thereby degrading the antireflection performance.

In order not to cause poor appearance due to the nonuniformity of the film or inhibition of the bonding formation between particles during film formation, the aggregation of the organic aluminum compound can be inhibited. However, it is difficult to inhibit the aggregation of the organic aluminum compound while the sol is maintained at a stable state without controlling the structure of the organic aluminum compound and thus to provide an optical film having satisfactory appearance and antireflection performance by baking at a temperature of lower than 200° C.

In a liquid-phase method (sol-gel method) to form an antireflection coating film from such a precursor sol of aluminum oxide, there is a demand for a precursor sol of aluminum oxide such that the appearance of an optical member is not impaired by the aggregation of the organic aluminum compound. Furthermore, there is a demand for a precursor sol of aluminum oxide capable of being formed into a high-performance antireflection coating film at a lower temperature, an optical member, and a method for producing an optical member using the precursor sol of aluminum oxide.

The present invention has been made in view of the related art described above. Aspects of the present invention provide an optical member in which the nonuniformity of an antireflection coating film is minimized and in which satisfactory antireflection performance is achieved even when baking treatment is performed at a low temperature, and provide a method for producing the optical member. Furthermore, aspects of the present invention provide a precursor sol of aluminum oxide, the precursor sol inhibiting the aggregation thereof, and a method for producing the precursor sol of aluminum oxide.

SUMMARY OF THE INVENTION

According to one aspect of the present invention, a precursor sol of aluminum oxide contains a polycondensate formed by the hydrolysis of an aluminum alkoxide or an aluminum salt, a solvent, and an organic aluminum compound of general formula (1):

[Chem. 1]

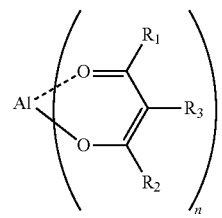

general formula (1)

wherein $R_1$ and $R_2$ each represent an alkyl group having 1 to 6 carbon atoms, a perfluoroalkyl group, or an allyl group; $R_3$ represents an alkyl group having 1 to 6 carbon atoms, a perfluoroalkyl group, an allyl group, or an aryl group; and n represents an integer of 1 to 3.

According to another aspect of the present invention, a method for producing an optical member includes the steps of (a) feeding a precursor sol of aluminum oxide according to aspects of the present invention onto at least one surface of a base, (b) spreading the precursor sol of aluminum oxide on the base, (c) drying and/or baking the base to form an aluminum oxide film, and (d) immersing the aluminum oxide film in hot water with a temperature of 60° C. to 100° C. to form a textured structure composed of aluminum oxide boehmite.

According to another aspect of the present invention, an optical member includes a layer on a surface of a base, the layer mainly containing aluminum oxide and having a textured structure formed of aluminum oxide crystals, in which the optical member meets the following expression (1):

[Math. 1]

$$Y - X \leq 0.4 \qquad (1)$$

where letting the number of aluminum atoms obtained by analyzing a surface of the optical member using X-ray photoelectron spectroscopy at a photoelectron take-off angle of 45° be 1, X represents the ratio of the number of oxygen atoms to the number of aluminum atoms, i.e., O/Al; and letting the number of aluminum atoms obtained by analyzing the surface of the optical member using X-ray photoelectron spectroscopy at a photoelectron take-off angle of 75° be 1, Y represents the ratio of the number of oxygen atoms to the number of aluminum atoms, i.e., O/Al.

According to another aspect of the present invention, an optical member includes a layer on a surface of a base, the layer being mainly composed of aluminum oxide and having a textured structure composed of aluminum oxide crystals, in which the textured structure has a height of 240 nm or more and a degree of minute light scattering of 6.0 or less.

According to aspects of the present invention, it is possible to provide an optical member having satisfactory antireflection performance by baking treatment even at a low temperature and a method for producing the optical member. It is also possible to provide a precursor sol of aluminum oxide, the precursor sol containing an organic aluminum compound that is less likely to aggregate, and a method for producing the precursor sol of aluminum oxide.

Further features of the present invention will become apparent from the following description of exemplary embodiments with reference to the attached drawings.

DESCRIPTION OF THE EMBODIMENTS

Embodiments of the present invention will be described in detail below.

A method for producing an optical member according to aspects of the present invention includes the steps of (a) feeding a precursor sol of aluminum oxide according to aspects of the present invention onto at least one surface of a base, (b) spreading the precursor sol of aluminum oxide on the base, (c) drying and/or baking the base to form an aluminum oxide film, and (d) immersing the aluminum oxide film in hot water with a temperature of 60° C. to 100° C. to form a textured structure composed of aluminum oxide crystals.

The optical member can include an antireflection coating film having a layer mainly composed of aluminum oxide on at least one surface of the base, the layer having the textured structure formed of plate-like crystals containing aluminum oxide.

FIGS. 1A to 1D are process drawings illustrating a method for producing an optical member according to an embodiment of the present invention.

Step (a)

Figure 1A:
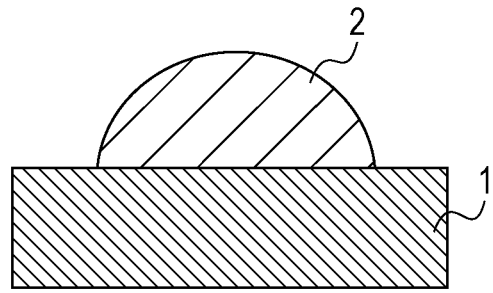
FIGS. 1A to 1D are process drawings illustrating a method for producing an optical member according to an embodiment of the present invention.

FIG. 1A illustrates a state in which a precursor sol 2 of aluminum oxide is fed onto a base 1 in the step (a). A precursor sol of aluminum oxide according to aspects of the present invention is used as the precursor sol 2 of aluminum oxide. The precursor sol of aluminum oxide according to aspects of the present invention contains, as described in detail below, a polycondensate formed by the hydrolysis of an aluminum alkoxide, a solvent, and an organic aluminum compound of general formula (1):

[Chem. 2]

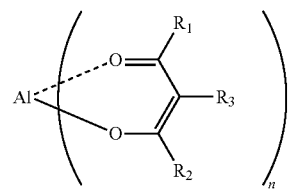

general formula (1)

wherein $R_1$ and $R_2$ each represent an alkyl group having 1 to 6 carbon atoms, a perfluoroalkyl group, or an allyl group; $R_3$ represents an alkyl group having 1 to 6 carbon atoms, a perfluoroalkyl group, an allyl group, or an aryl group; and n represents an integer of 1 to 3.

Examples of a method for feeding the precursor sol 2 of aluminum oxide include a method in which the precursor sol 2 of aluminum oxide is dropped through a narrow tube, one or more small openings, or the like; a method in which the precursor sol 2 of aluminum oxide is attached to the base 1 through a slit; and a method in which the precursor sol 2 of aluminum oxide is temporarily attached to a plate and then transferred to the base 1. Alternatively, the base 1 is fed with the precursor sol 2 of aluminum oxide by immersing the base 1 in the precursor sol 2.

Here, an explanation is given for the precursor sol of aluminum oxide according to aspects of the present invention.

The precursor sol of aluminum oxide according to aspects of the present invention contains a polycondensate formed by the hydrolysis of an aluminum alkoxide or an aluminum salt, a solvent, and an organic aluminum compound of general formula (1):

[Chem. 3]

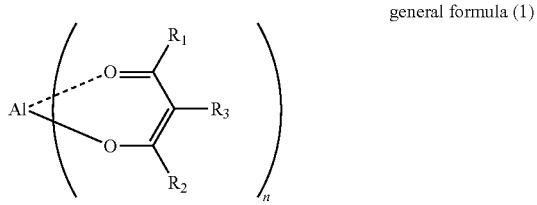

general formula (1)

wherein $R_1$ and $R_2$ each represent an alkyl group having 1 to 6 carbon atoms, a perfluoroalkyl group, or an allyl group; $R_3$ represents an alkyl group having 1 to 6 carbon atoms, a perfluoroalkyl group, an allyl group, or an aryl group; and n represents an integer of 1 to 3.

The precursor sol of aluminum oxide according to aspects of the present invention is applied on a base, dried, and immersed in hot water to form a textured structure composed of aluminum oxide boehmite. So, the precursor sol of aluminum oxide is suitable for use in the method for producing an optical member according to aspects of the present invention.

The precursor sol of aluminum oxide according to aspects of the present invention mainly contains a hydrolysate and/or a condensate thereof formed by bringing an aluminum compound into contact with water in a solvent. Letting the aluminum compound be Al—$X_3$ (wherein X represents an alkoxy group, an acyloxy group, a halogen groups, or a nitrate ion), the hydrolysate of the aluminum compound is expressed as Al—$X_2$(OH), Al—X(OH)$_2$, or Al—(OH)$_3$. A reaction between the —OH groups or between the —X group and the —OH group of the hydrolysate gives an Al—O—Al bond and is accompanied by the elimination of $H_2O$ or XH. The resulting compound having one or more Al—O—Al bonds and having a linear or branched structure is defined as a condensate of the aluminum compound. The resulting particles can be amorphous.

The proportion of the particles containing the hydrolysate of the aluminum compound and/or the condensate of the hydrolysate in the precursor sol of aluminum oxide according to aspects of the present invention may be in the range of 1% by weight to 7% by weight, such as 2.5% by weight to 6% by weight on a metal oxide basis. An excessively high proportion of the particles results in an increase in the viscosity of the sol. This is liable to cause an increase in the thickness of a film formed by one coating operation and nonuniformity of the film, thereby failing to provide desired antireflection performance. An excessively low proportion results in an excessively small thickness of a film formed by one coating operation. This requires the repetition of application and heating, thereby increasing the number of steps and the possibility of causing poor appearance.

Specific examples of the aluminum compound and so forth are described below.

Examples of the aluminum compound include aluminum ethoxide, aluminum isopropoxide, aluminum n-butoxide, aluminum sec-butoxide, aluminum tert-butoxide, aluminum acetylacetonate, oligomers thereof, aluminum nitrate, aluminum chloride, aluminum acetate, aluminum phosphate, aluminum sulfate, and aluminum hydroxide.

Among these metal compounds, a metal alkoxide, for example, aluminum n-butoxide or aluminum sec-butoxide, can be used as a raw material.

The aluminum alkoxide is highly reactive with water and is rapidly hydrolyzed by water in air or by the addition of water to form a white turbidity and precipitates. Furthermore, it is difficult to dissolve an aluminum salt compound in an organic solvent alone, so that the resulting solution has low stability. To prevent these problems from occurring, a stabilizer can be added to increase the stability of the solution.

As the stabilizer, a β-diketone compound is used. A β-diketone compound exhibits keto-enol tautomerism and is converted into an enolate in a solvent. The enolate reacts with a metal alkoxide with the elimination of alcohol and is coordinated with an aluminum atom to form an organometallic compound. The coordination of the stabilizer with an oligomeric metal alkoxide inhibits the rapid hydrolysis of the metal alkoxide. When the metal alkoxide is hydrolyzed to grow particles, a released enolate is further coordinated with a metal alkoxide with which an enolate has already been coordinated.

In this way, the stabilizer forms a chelate together with the aluminum alkoxide. The organic aluminum compound formed in the precursor sol of aluminum oxide can aggregate, depending on its chemical structure. It is speculated that the aggregation of the organic aluminum compound inhibits bonding between particles formed by the hydrolysis of the aluminum alkoxide in an optical film during baking. If the bonding between the particles is not sufficient, the textured structure composed of aluminum oxide boehmite is not sufficiently formed, thereby degrading the antireflection performance. The organic aluminum compound can have a sublimation point of 150° C. or higher. Thus, the organic aluminum compound is not completely removed from the aluminum oxide film by baking at a baking temperature lower than 200° C.

Furthermore, in the case where a sol obtained from a stabilizer and a metal alkoxide containing aluminum serving as raw materials is applied on an optical member to form a film, an organic aluminum compound can aggregate to cause poor appearance, such as the nonuniformity of the film.

So, the precursor sol of aluminum oxide according to aspects of the present invention contains a stabilizer having an alkyl group with 1 to 6 carbon atoms, a perfluoroalkyl group, an allyl group, or an aryl group at the α-position. The stabilizer also has an alkyl group with 1 to 6 carbon atoms, a perfluoroalkyl group, or an allyl group at the γ-position. To inhibit the aggregation of the organic aluminum compound, a stabilizer having a sterically bulky substituent may be used. However, the use of a stabilizer having a sterically bulky substituent at the γ-position also inhibits the coordination of the stabilizer with the aluminum alkoxide, thus failing to maintain the aluminum alkoxide in a stable state. So, the aggregation of the organic aluminum compound is inhibited by placing a substituent in the α-position. The α-position is located on the opposite side of the ketone groups. Thus, the substituent does not sterically inhibit the coordination of the stabilizer with the aluminum alkoxide and inhibits only the aggregation of the organic aluminum compound particles. However, in the case where a substituent, such as a long-chain alkyl group, itself has interaction, the effect of inhibiting the aggregation is presumably reduced. So, in order to inhibit the aggregation of the organic aluminum compound, a β-diketone compound having an alkyl group with 1 to 6 carbon atoms, a perfluoroalkyl group, an allyl group, or aryl group at the α-position is used. Furthermore, the α-carbon of an organic aluminum compound composed of a stabilizer having an electron-donating functional group at the α-position is likely to undergo an electrophilic reaction. Thus, the organic aluminum compound composed of a stabilizer having an electron-donating functional group at the α-position is decomposed into a compound having a lower boiling point. So, the organic aluminum compound can be removed from a film during baking. To stabilize the aluminum alkoxide, a β-diketone compound having an alkyl group with 1 to 6 carbon atoms, a perfluoroalkyl group, or an allyl group at the γ-position is used.

Examples of the stabilizer having an alkyl group with 1 to 6 carbon atoms, a perfluoroalkyl group, an allyl group, or an aryl group at the α-position and having an alkyl group with 1 to 6 carbon atoms, a perfluoroalkyl group, or an allyl group at the γ-position include 3-methyl-2,4-pentanedione, 3-ethyl-2,4-pentanedione, 3-butyl-2,4-pentanedione, 3-pentyl-2,4-pentanedione, 3-hexyl-2,4-pentanedione, 3-isopropyl-2,4-pentanedione, 3-isobutyl-2,4-pentanedione, 3-isopentyl-2,4-pentanedione, 3-isohexyl-2,4-pentanedione, 3-phenyl-2,4-pentanedione, and perfluoroacetylacetone.

The amount of the stabilizer added varies depending on the type of metal compound and can be in the range of 0.5 mol to 2 mol with respect to 1 mol of the aluminum alkoxide. The effect of the stabilizer is exerted by mixing the stabilizer with the alkoxide for a predetermined period of time before the addition of water.

To cause hydrolysis, an appropriate amount of water is required to be added. The appropriate amount of water added varies depending on the solvent and concentration. The amount of water added can be 0.5 mol or more and less than 2 mol with respect to 1 mol of the aluminum compound.

For the purpose of partially promoting a hydrolysis reaction, a catalyst may be added to water. A catalyst containing an acid, e.g., hydrochloric acid or phosphoric acid, or a base can be used in a concentration of 0.1 mol/L or less. The addition of the acid or base catalyst makes it possible to control the shape of particles formed by the hydrolysis of the aluminum alkoxide. Furthermore, in the case where the precursor sol of aluminum oxide contains an acid or base in a concentration of 0.001% by weight or more and less than 0.06% by weight, the stability of the precursor sol of aluminum oxide is further improved.

An organic solvent may be used as the solvent so long as raw materials, such as the aluminum compound, are uniformly dissolved in the organic solvent without causing the aggregation of the particles. Examples of the organic solvent include monohydric alcohols, such as methanol, ethanol, 1-propanol, 2-propanol, 1-butanol, 2-butanol, 2-methylpropanol, 1-pentanol, 2-pentanol, cyclopentanol, 2-methylbutanol, 3-methylbutanol, 1-hexanol, 2-hexanol, 3-hexanol, 4-methyl-2-pentanol, 2-methyl-1-pentanol, 2-ethylbutanol, 2,4-dimethyl-3-pentanol, 3-ethylbutanol, 1-heptanol, 2-heptanol, 1-octanol, and 2-octanol; di- or higher-hydric alcohols, such as ethylene glycol and triethylene glycol; ether alcohols, such as methoxyethanol, ethoxyethanol, propoxyethanol, isopropoxyethanol, butoxyethanol, 1-methoxy-2-propanol, 1-ethoxy-2-propanol, and 1-propoxy-2-propanol; ethers, such as dimethoxyethane, diglyme, tetrahydrofuran, dioxane, diisopropyl ether, and cyclopentyl methyl ether; esters, such as ethyl formate, ethyl acetate, n-butyl acetate, ethylene glycol monomethyl ether acetate, ethylene glycol monoethyl ether acetate, ethylene glycol mono-n-butyl ether acetate, and propylene glycol monomethyl ether acetate; aliphatic and alicyclic hydrocarbons, such as n-hexane, n-octane, cyclohexane, cyclopentane, and cyclooctane; aromatic hydrocarbons, such as toluene, xylene, and ethylbenzene; ketones, such as acetone, methyl ethyl ketone, methyl isobutyl ketone, and cyclohexanone; chlorinated hydrocarbons, such as chloroform, methylene chloride, carbon tetrachloride, and tetrachloroethane; and aprotic polar solvents, such as N-methylpyrrolidone, N,N-dimethylformamide, N,N-dimethylacetamide, and ethylene carbonate.

Among these solvents, a monohydric alcohol having 5 to 8 carbon atoms can be provided because of its low hygroscopicity and a high solubility of the aluminum compound therein. The progression of the hydrolysis of the aluminum compound due to the moisture absorption of the solvent makes the control of the particle size difficult. Furthermore, moisture absorption during coating leads to the aggregation of the particles, thereby deteriorating the stability of optical properties. In the case of using a common alcohol with a low boiling point, the solvent evaporates rapidly. Thus, the foregoing stabilizer remains in the resulting film, affecting the optical properties. In the case of using a monohydric alcohol having 5 to 8 carbon atoms, the solvent is evaporated together with the stabilizer during drying and/or baking, so that the stabilizer is almost removed. Meanwhile, the monohydric alcohol having 5 to 8 carbon atoms is highly hydrophobic; hence, water required for hydrolysis is not uniformly mixed in the alcohol, which makes the formation of a constant particle size difficult. Thus, the monohydric alcohol having 5 to 8 carbon atoms can be used in combination with a water-miscible solvent. The term "water-miscible solvent"described here is used to indicate a solvent having miscibility with water of 80% by weight or more at 23° C.

The precursor sol of aluminum oxide according to aspects of the present invention may have a solvent content of 50% by weight to 98% by weight and even 60% by weight to 93% by weight.

Regarding the mixing ratio of the solvents, the proportion of the monohydric alcohol having 5 to 8 carbon atoms can be in the range of 50% by weight to 90% by weight, and the proportion of the water-miscible solvent having a boiling point of 110° C. to 170° C. can be in the range of 10% by weight to 50% by weight. An excessively small amount of the monohydric alcohol having 5 to 8 carbon atoms leads to nonuniformity in thickness at the time of coating, thus reducing the appearance. An excessively large amount of the monohydric alcohol having 5 to 8 carbon atoms leads to an increase in the hydrophobicity of the solvent, so that water is not uniformly dispersed.

As the water-miscible solvent, a water-miscible solvent having a boiling point of 110° C. to 170° C. is used. The use of a water-miscible solvent having a boiling point of less than 110° C. is liable to cause whitening and moisture absorption due to evaporation. In the case of using a water-miscible solvent having a boiling point exceeding 170° C., the water-miscible solvent remains in the resulting aluminum oxide film even after drying, thereby leading to variations in reflectivity. The water-miscible solvent can be glycol ether.

In the case of preparing the precursor sol of aluminum oxide according to aspects of the present invention, heating may be performed to promote the hydrolysis and the condensation reaction of the aluminum alkoxide. The heating temperature varies depending on the boiling point of the solvent and may be in the range of 60° C. to 150° C. The heating allows the particles to grow, improving particle properties.

A precursor sol of aluminum oxide may contain a small amount of at least one metal compound selected from compounds of Zr, Si, Ti, Zn, and Mg, together with an aluminum compound. Examples of the metal compounds that can be used include metal alkoxides and metal salts, such as metal chlorides and metal nitrates. In particular, a metal alkoxide can be used because, for example, a by-product formed in preparing a sol has only a minor effect on coatability. Furthermore, the proportion of the aluminum compound can be 90 mole percent or more with respect to 100 mole percent of the total amount of the metal compounds.

Examples of a zirconium alkoxide include zirconium tetramethoxide, zirconium tetraethoxide, zirconium tetra-n-propoxide, zirconium tetraisopropoxide, zirconium tetra-n-butoxide, and zirconium tetra-tert-butoxide.

Various silicon alkoxides represented by a general formula $Si(OR)_4$ may be used, wherein the R's are the same or different, with each representing a lower alkyl group, e.g., a methyl group, an ethyl group, a propyl group, an isopropyl group, a butyl group, or an isobutyl group.

Examples of a titanium alkoxide include tetramethoxytitanium, tetraethoxytitanium, tetra-n-propoxytitanium, tetraisopropoxytitanium, tetra-n-butoxytitanium, and tetraisobutoxytitanium.

Examples of a zinc compound include zinc acetate, zinc chloride, zinc nitrate, zinc stearate, zinc oleate, and zinc salicylate. In particular, zinc acetate and zinc chloride can be provided.

Examples of a magnesium compound include magnesium alkoxide, such as dimethoxymagnesium, diethoxymagnesium, dipropoxymagnesium, and dibutoxymagnesium; magnesium acetylacetonate; and magnesium chloride.

Among these metal compounds, the metal alkoxides, such as zirconium tetraisopropoxide, zirconium tetra-n-butoxide, tetramethoxysilane, tetraethoxysilane, tetraisopropoxytitanium, tetra-n-butoxytitanium, dipropoxymagnesium, and dibutoxymagnesium, can be used as raw materials.

Step (b)

In the method for producing an optical member according to aspects of the present invention, the step (b) of spreading the precursor sol of aluminum oxide on a base will be described below.

Figure 1B:
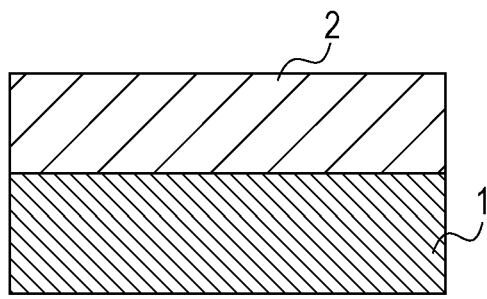

FIG. 1B shows a state in which the precursor sol 2 of aluminum oxide fed in the step (a) is spread on the base 1 in the step (b). Examples of a method for spreading the precursor sol 2 of aluminum oxide on the base 1 include spin coating in which the dropped sol 2 is spread by rotating the base 1; and blade coating and roll coating in which the sol 2 dropped on the base 1 is spread by moving a blade and a roll. Alternatively, the precursor sol 2 of aluminum oxide can be spread while being fed. Examples thereof include slit coating in which the precursor sol 2 of aluminum oxide is spread by moving a slit or the base 1 while the precursor sol 2 of aluminum oxide is being fed through the slit; and printing in which the sol 2 temporarily attached to a plate is transferred by moving the base 1.

A further example thereof is dip coating in which the base 1 is immersed in the precursor sol 2 of aluminum oxide and then drawn at a fixed speed. In the case of producing an optical member having a three-dimensionally complex shape, such as a concave shape, it is difficult to bring a feeder of the precursor sol 2 of aluminum oxide near to the member; hence, spin coating may be employed.

The precursor sol of aluminum oxide can be applied so as to form a film having a thickness of 150 nm or more. This makes it possible to form a fine textured structure with sufficient height, thereby further enhancing antireflection performance at oblique incidence.

Step (c)

In the method for producing an optical member according to aspects of the present invention, the step (c) of drying and/or baking the base to form an aluminum oxide film will be described below.

Figure 1C:
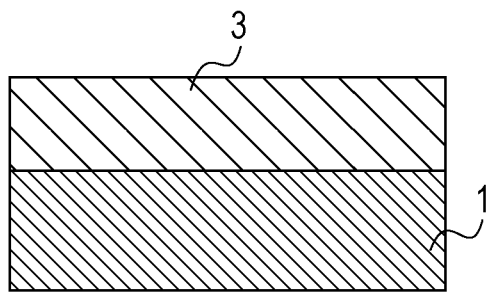

FIG. 1C shows a state in which the base 1 is dried and/or baked to form an aluminum oxide film 3 in the step (c). When the base 1 is dried by heating, the solvent in the precursor sol 2 of aluminum oxide that has been spread on the base 1 in the step (b) is evaporated, so that the particles in the sol 2 are deposited to form the aluminum oxide film 3. Further heating the resulting film promotes the condensation reaction of unreacted alkoxide and hydroxy groups. The heating temperature can be 140° C. or higher, which is a temperature that can be required to evaporate the solvent, and 200° C. or lower in view of the effect on the base and other peripheral members. Examples of a heating method include a method for heating the base in a circulating hot air oven, a muffle furnace, or an induction heating (IH) furnace; and a method for heating the base with an infrared (IR) lamp.

Step (d)

In the method for producing an optical member according to aspects of the present invention, the step (d) of immersing the aluminum oxide film in hot water with a temperature of 60° C. to 100° C. to form a textured structure formed of aluminum oxide crystals will be described below.

Figure 1D:
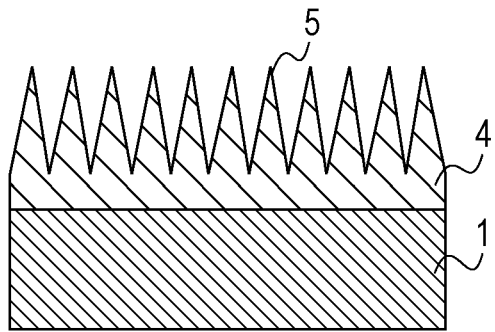

FIG. 1D shows a state in which a layer 4 mainly composed of aluminum oxide is formed on the base 1 in the step (d), the layer having a textured structure 5 formed of aluminum oxide crystals. The textured structure 5 is formed by bringing the aluminum oxide film 3 formed in the step (c) into contact with hot water with a temperature of 60° C. to 100° C. The textured structure formed of the aluminum oxide crystals is mainly formed of crystals composed of aluminum oxide, aluminum hydroxide, or aluminum oxide hydrate. In particular, the textured structure can be composed of boehmite. Examples of a method for bringing the aluminum oxide film 3 into contact with hot water include a method in which the base 1 is immersed in hot water; and a method in which the aluminum oxide film 3 is brought into contact with running hot water or atomized hot water. Hereinafter, the crystals formed by bringing the aluminum oxide film into contact with hot water is referred to as "aluminum oxide crystals", "plate-like crystals mainly containing aluminum oxide", "plate-like crystals containing aluminum oxide", "plate-like crystals" or "aluminum oxide boehmite".

The textured structure 5 formed of aluminum oxide crystals can be formed of plate-like crystals mainly containing aluminum oxide. The plate-like crystals mainly containing aluminum oxide can be boehmite.

An embodiment of the optical member according to aspects of the present invention, the optical member being produced by the method for producing an optical member according to aspects of the present invention, will be described below. The optical member according to aspects of the present invention includes a layer on a surface of a base, the layer being mainly composed of aluminum oxide and having a textured structure composed of aluminum oxide crystals.

Figure 2:
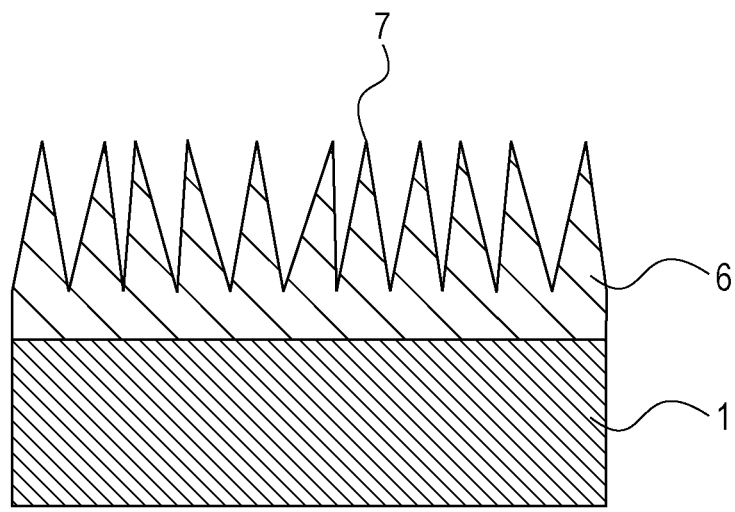
FIG. 2 is a schematic view of an optical member according to an embodiment of the present invention.

FIG. 2 shows a schematic cross-sectional view of an optical member according to this embodiment.

In FIG. 2, a layer 6 mainly containing aluminum oxide is stacked on the base 1, a surface of the layer 6 being formed of plate-like crystals, and the plate-like crystals mainly containing aluminum oxide. The aluminum oxide crystals or the plate-like crystals mainly containing aluminum oxide are formed of crystals composed of aluminum oxide, aluminum hydroxide, or aluminum oxide hydrate. In particular, the plate-like crystals can be composed of boehmite. In the present invention, each of aluminum oxide, aluminum hydroxide, and aluminum oxide hydrate is referred to as "aluminum oxide". Furthermore, at least one oxide layer composed of aluminum oxide alone or an oxide layer which contains one of $ZrO_2$, $SiO_2$, $TiO_2$, ZnO, and MgO and which has an aluminum oxide content of 70% by mole or more is referred to as a "layer mainly containing aluminum oxide".

Furthermore, the ends of the plate crystals form a fine textured structure 7. To increase the height of fine projections and reduce intervals of the projections, the plate-like crystals may be selectively arranged at a specific angle to the surface of the base.

Figure 3:
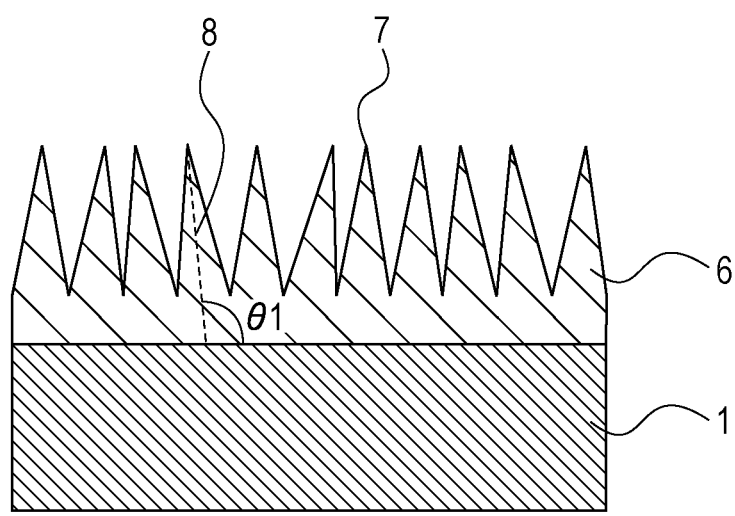
FIG. 3 is a schematic view of an optical member according to an embodiment of the present invention.

As shown in FIG. 3, in the case where the surface of the base 1 is flat like a surface of a flat plate, a film, a sheet, or the like, the plate crystals can be arranged in such a manner that the average angle of angles θ1 defined by inclination directions 8 of the plate crystals and the surface of the base may be in the range of 45° to 90°, such as 60° to 90°.

Figure 4:
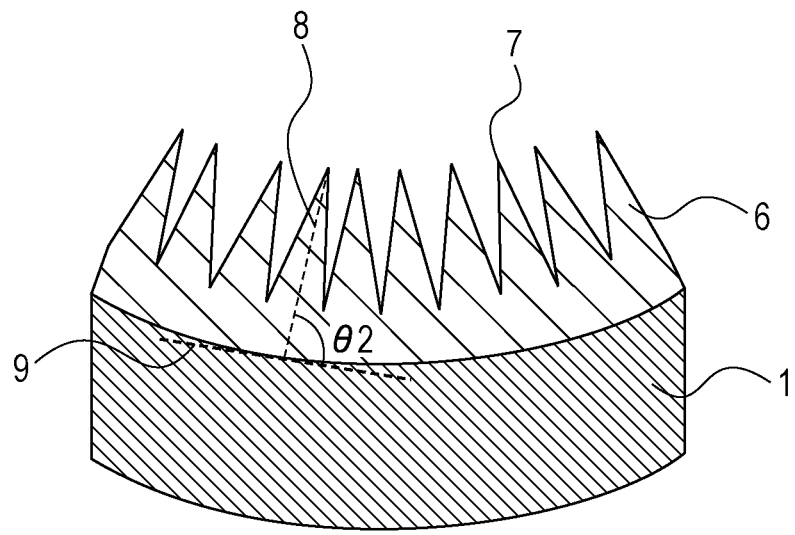
FIG. 4 is a schematic view of an optical member according to an embodiment of the present invention.

As shown in FIG. 4, in the case where the surface of the base 1 is two- or three-dimensionally curved, the plate-like crystals can be arranged in such a manner that the average angle of angles θ2 defined by the inclination directions 8 of the plate-like crystals and a tangent 9 to the surface of the base may be in the range of 45° to 90°, such as 60° to 90°.

The layer 6 mainly containing aluminum oxide may have a thickness of 20 nm to 1000 nm, such as 50 nm to 1000 nm, and even 240 nm to 1000 nm. In the case where the layer constituting the textured structure has a thickness of 20 nm to 1000 nm, the fine textured structure provides effective antireflection performance. Furthermore, the mechanical strength of the textured structure is not reduced, thus advantageously reducing the production cost of the fine textured structure. A thickness of the layer of 50 nm to 1000 nm can result in a further increase in antireflection performance. A thickness of the layer of 240 nm to 1000 nm can result in a further increase in antireflection performance at oblique incidence.

The optical member according to aspects of the present invention is characterized by a very low nonuniformity of the film. The inventors have conducted intensive studies and have found that a difference in crystal state between the surface portion and the inner portion of the film is small compared with those of textured structures composed of aluminum oxide crystals of optical members in the related art. The optical member according to aspects of the present invention has the fine textured structure 7 at the end portions of the layer 6 mainly containing aluminum oxide stacked on the base 1. The fine textured structure continuously changes the refractive index from the refractive index of air to the refractive index of the base, thereby eliminating the boundary surface to provide the antireflection performance. Thus, the difference in crystal state between the surface portion and the inner portion of the fine textured structure 7 can be small. Furthermore, the refractive index of the surface portion can be minimized.

However, in the case of the optical member having the textured structure, which is formed of the aluminum oxide crystals, formed by immersing the film mainly containing aluminum oxide in hot water, the contact of the aluminum oxide film with hot water having a temperature of 60° C. to 100° C. results in the formation of the layer of mixed plate-like crystals including crystals of aluminum oxide, aluminum hydroxide, and/or aluminum oxide hydrate and results in the formation of the textured structure of the end portions of the plate-like crystals. So, the difference in the degree of the reaction of aluminum occurs between the inner portion and the surface portion that is brought into direct contact with hot water. Furthermore, the aggregation of the organic aluminum compound inhibits the formation of uniform plate-like crystals of aluminum oxide. This may lead to reductions in antireflection performance and the uniformity of the film, thereby causing poor appearance due to the nonuniformity of the film.

The optical member formed by the use of the precursor sol of aluminum oxide according to aspects of the present invention has only a small difference in crystal state between the surface portion and the inner portion of the textured structure formed of the aluminum oxide crystals and has improved uniformity of the film. Furthermore, there is no nonuniformity of the film.

An example of a method for evaluating crystal states of the surface portion and the inner portion of the textured structure formed on the surface of the layer mainly containing aluminum oxide will be described below.

The ratio of the number of oxygen atoms to the number of aluminum atoms, i.e., O/Al, when the number of aluminum atoms is defined as 1 is calculated from the composition formula of the aluminum compound. This enables us to simulatively quantify the reaction state of aluminum. For example, the ratio O/Al of aluminum hydroxide ($Al(OH)_3$) is 3. The ratio O/Al of aluminum oxide ($Al_2O_3$) is 1.5. The ratio O/Al of aluminum oxide boehmite (AlO(OH)) is 2. The state of aluminum oxide crystals in the textured structure is evaluated by measuring the element ratio of oxygen to aluminum at each of the surface portion and the inner portion of the layer mainly containing aluminum oxide.

As a method for measuring the ratio of the number of oxygen atoms to the number of aluminum atoms at each of the surface portion and the inner portion of the textured structure, surface elemental analysis using X-ray photoelectron spectroscopy (hereinafter, referred to as "XPS analysis") may be employed. First, an XPS survey spectrum is taken from the textured structure according to aspects of the present invention in order to detect the presence of all elements. The survey spectrum indicates that proportions of four elements of carbon (C), oxygen (O), fluorine (F), and aluminum (Al) are particularly high. So, peaks of C1s, O1s, F1s, and Al2p are selected. Narrow spectra of C1s, O1s, F1s, and Al2p are measured to determine a more accurate elemental ratio. The ratio of the number of oxygen atoms to the number of aluminum atoms in an area irradiated with X-rays can be calculated on the basis of the elemental analysis results of the peak areas thereof.

In XPS analysis, in the case where the photoelectron take-off angle is changed by tilting a measurement sample, effective detection depth is changed. Here, the term "photoelectron take-off angle" indicates the angle between the surface of the measurement sample and a normal to a detector. Specifically, a lower photoelectron take-off angle results in a smaller escape depth of photoelectrons, so that the information of only the shallower portion of the layer is detected. The use of this principle enables us to separately acquire the information about only the surface portion and the information about a region extending from the surface portion to the inner portion. In this case, there is no need to perform steps of taking out the measurement sample from an X-ray photoelectron spectrometer or processing the measurement sample. Furthermore, there is no need to perform treatment to etch the surface of the sample by sputtering.

Thus, with respect to a method for evaluating the textured structure formed of aluminum oxide crystals on the surface of the layer mainly containing aluminum oxide according to aspects of the present invention, the surface of the layer mainly containing aluminum oxide is analyzed by X-ray photoelectron spectroscopy. Specifically, the ratio of the number of oxygen atoms to the number of aluminum atoms detected when a region is measured at a photoelectron take-off angle of 45° to a surface of the base is compared with that when the region is measured at a photoelectron take-off angle of 75° to the surface of the base. Surface elemental analysis is performed under these conditions to provide photoelectron spectra. From the photoelectron spectra, it is possible to calculate the number of oxygen atoms when the number of aluminum atoms is defined as 1, i.e., O/Al.

Figure 7A:
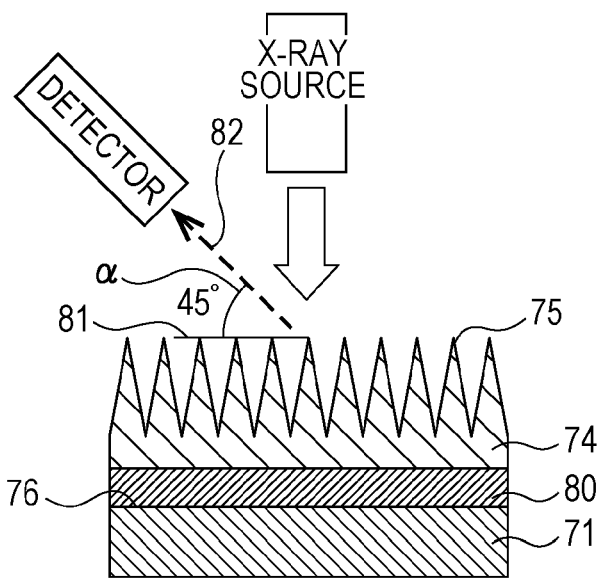
FIGS. 7A and 7B illustrate photoelectron take-off angles.
Figure 7B:
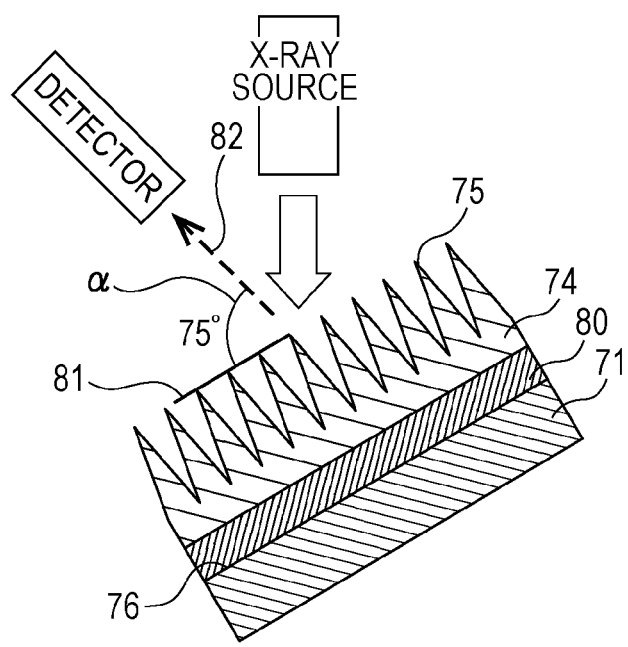
Figure 8A:
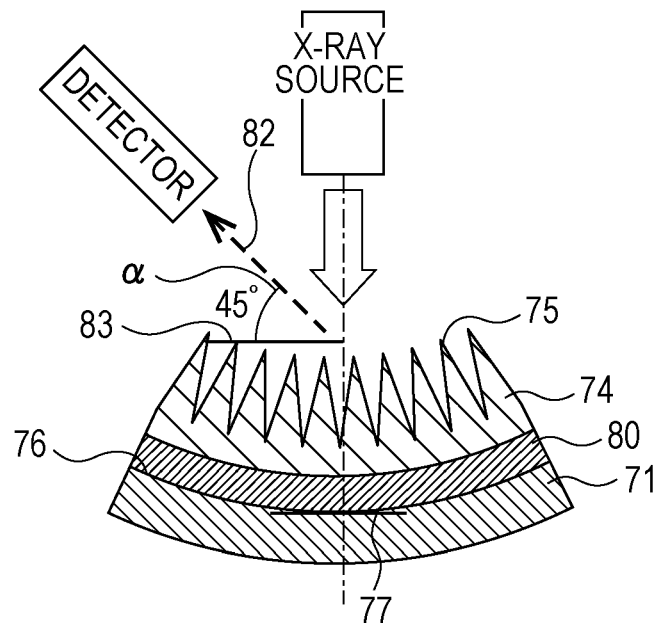
FIGS. 8A and 8B illustrate photoelectron take-off angles.
Figure 8B:
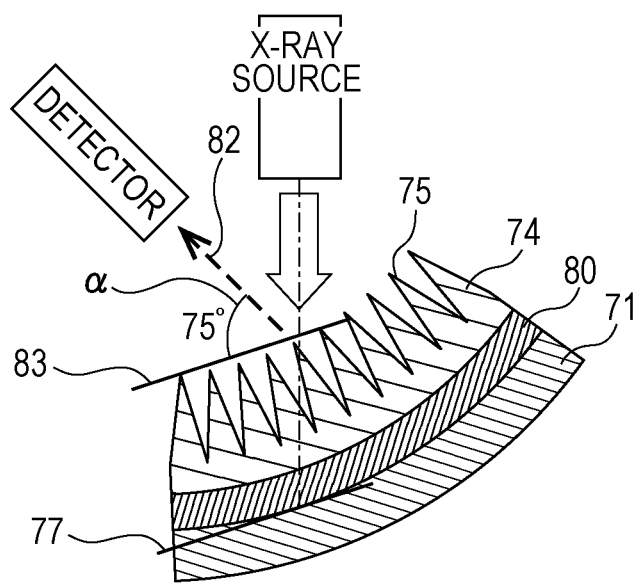

According to aspects of the present invention, the crystal states of the surface portion and the inner portion of the textured structure formed of the aluminum oxide crystals are evaluated by comparison of the ratios O/Al calculated at different take-off angles. FIGS. 7A to 8B illustrate photoelectron take-off angles. FIG. 7A illustrates the case where a surface 76 of the base is a flat plane, like a surface of a flat plate, a film, a sheet, or the like, and illustrates a state in which surface elemental analysis is performed at a photoelectron take-off angle α of 45° with respect to the surface 76 of the base. FIG. 7B illustrates the case where the surface 76 of the base is flat, like a surface of a flat plate, a film, a sheet, or the like, and illustrates a state in which surface elemental analysis is performed at a photoelectron take-off angle α of 75° with respect to the surface 76 of the base. In each of FIGS. 7A and 7B, for simplicity's sake, the angle between a line 81 parallel to the surface 76 of the base and the normal 82 to the detector is illustrated as the photoelectron take-off angle and is equal to the angle between the surface 76 of the base and the normal 82 to the detector. FIG. 8A illustrates the case where the surface 76 of the base is two- or three-dimensionally curved and illustrates a state in which surface elemental analysis is performed at a photoelectron take-off angle α of 45° with respect to the surface 76 of the base. In the case where the surface of the base is two- or three-dimensionally curved, the angle between a tangent 77 to a surface of the base at a portion irradiated with X-rays and the normal 82 to the detector is defined as 45°. FIG. 8B illustrates the case where the surface 76 of the base is two- or three-dimensionally curved and illustrates a state in which surface elemental analysis is performed at a photoelectron take-off angle α of 75° with respect to the surface 76 of the base. In the case where the surface of the base is two- or three-dimensionally curved, the angle between the tangent 77 to the surface of the base at a portion irradiated with X-rays and the normal 82 to the detector is defined as 75°. In each of FIGS. 8A and 8B, for simplicity's sake, the angle between a line 83 parallel to the tangent 77 to the surface of the base and the normal 82 to the detector is illustrated as the photoelectron take-off angle and is equal to the angle between the tangent 77 to the surface of the base at the portion irradiated with X-rays and the normal 82 to the detector.

While a layer 80 mainly containing a substance other than aluminum oxide is provided between a base 71 and a layer 74 mainly containing aluminum oxide in each of FIGS. 7A to 8B, the layer 80 mainly containing a substance other than aluminum oxide may or may not be provided.

A smaller difference between the ratio O/Al in the surface portion and the ratio O/Al in the inner portion of the textured structure leads to maintaining the better continuity of the refractive indices from the refractive index of air to the refractive index of the textured structure, a reduction in the nonuniformity of the film, and the development of satisfactory antireflection performance. According to aspects of the present invention, a smaller difference between the ratio O/Al at a photoelectron take-off angle of 45° to the base surface and the ratio O/Al measured at a photoelectron take-off angle of 75° to the base surface leads to a reduction in the nonuniformity of the film and the development of satisfactory antireflection performance. In the optical member according to aspects of the present invention, the difference between the ratio O/Al at a photoelectron take-off angle of 45° to the base surface and the ratio O/Al measured at a photoelectron take-off angle of 75° to the base surface can be 0.4 or less. Furthermore, a smaller ratio O/Al at a photoelectron take-off angle of 45° to the base surface results in a reduction in the refractive index of the aluminum compound. In the optical member according to aspects of the present invention, the ratio O/Al at a photoelectron take-off angle of 45° to the base surface can be 2.0 or less. That is, the optical member according to aspects of the present invention the layer on the base surface, the layer mainly containing aluminum oxide and having the textured structure formed of aluminum oxide crystals, in which the optical member meets the following expression (1):

[Math. 2]

$$Y - X \leq 0.4 \tag{1}$$

where letting the number of aluminum atoms obtained by analyzing a surface of the optical member using X-ray photoelectron spectroscopy at a photoelectron take-off angle of 45° be 1, X represents the ratio of the number of oxygen atoms to the number of aluminum atoms, i.e., O/Al; and letting the number of aluminum atoms obtained by analyzing the surface of the optical member using X-ray photoelectron spectroscopy at a photoelectron take-off angle of 75° be 1, Y represents the ratio of the number of oxygen atoms to the number of aluminum atoms, i.e., O/Al.

X can exceed 2.0.

Furthermore, the optical member according to aspects of the present invention has excellent antireflection performance for obliquely incident light whether or not the surface of the base is curved or flat. In the case where light parallel to an optical axis is incident on a lens having a large curvature, the angle of incidence increases with decreasing distance from the periphery of the lens, thereby increasing the irradiation area. This is liable to cause light scattering. For optical lenses, the occurrence of light scattering will affect images. For the optical member according to aspects of the present invention, the occurrence of light scattering is minimized.

Figure 9:
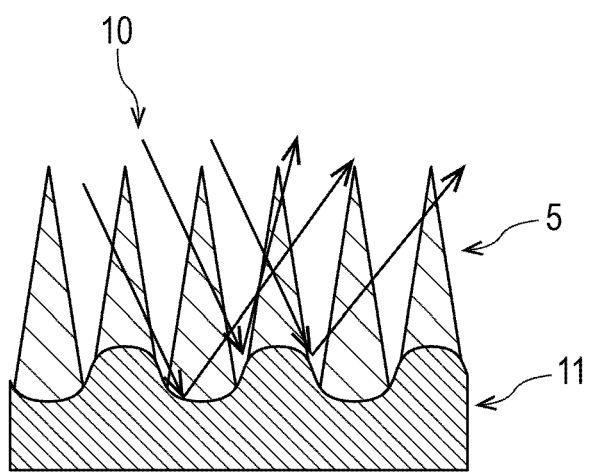
FIG. 9 illustrates minute light scattering.

To enhance antireflection performance at oblique incidence, it may be necessary to form a uniform fine textured structure having sufficient height. To form a textured structure, composed of aluminum oxide boehmite, having sufficient height, it may be necessary to increase the thickness of the aluminum oxide film. However, with respect to the aluminum oxide film having a large thickness, when the precursor sol of aluminum oxide is fed onto the base and dried and/or baked, the rate of volatilization of a solvent varies between a surface of the film and the boundary of the base. This reduces the uniformity of the textured structure composed of aluminum oxide boehmite formed through a dissolution-reprecipitation process, thereby causing minute light scattering. FIG. 9 illustrates the mechanism of the occurrence of the minute light scattering. The height and pitch of the textured structure are smaller than the wavelength of visible light. So, the minute light scattering is presumably caused by a difference in the height of the aluminum oxide film located below the textured structure composed of aluminum oxide boehmite and in the vicinity of the base.

It is speculated that in the case where the drying temperature and/or the baking temperature is high, the film is rapidly densified from the surface to shrink, thereby causing a nonuniform density distribution in the film and a change in solubility in hot water, so that the uniformity of the aluminum oxide film in the vicinity of the base is lost. A larger thickness causes the solvent to be less likely to evaporate from the inner portion of the film. Thus, the minute light scattering is liable to occur.

Meanwhile, in the case where the aluminum oxide film is formed at a low temperature, impurities are not completely evaporated and are contained in large amounts. So, the film is partially dissolved in hot water during hot water treatment, causing the nonuniformity of the film. Furthermore, aluminum oxide is rapidly dissolved together with impurities compared with the rate of reprecipitation. So, the microstructure is not sufficiently formed, reducing the antireflection performance.

To inhibit the minute light scattering, a method may be employed in which a high-boiling-point solvent is selected for the precursor sol of aluminum oxide so as to evaporate slowly even when the drying temperature and/or the baking temperature is high. Alternatively, a method may be employed in which impurities are removed from the aluminum oxide film even at a low temperature.

In the case where the high-boiling-point solvent is selected, when the precursor sol of aluminum oxide is fed onto the base, it takes time before the film is dry to the touch, thereby causing the radial nonuniformity of the film and degrading coatability. The selection of the solvent is not easy because the solvent directly affects the coatability.

The optical member formed by the use of the precursor sol of aluminum oxide according to aspects of the present invention has the textured structure having sufficient height and being formed of the aluminum oxide crystals. Furthermore, the optical member inhibits the minute light scattering and provides excellent antireflection performance.

A method for evaluating the minute light scattering will be described below. It is difficult to evaluate the minute light scattering by the degree of cloudiness. So, a measurement method is devised, and the degree of minute light scattering is defined and evaluated.

A 150-W halogen fiber illuminator (PHL-150C) is used as a light source. Light emitted from the halogen fiber illumination system passes through a rod homogenizer (RHO-13S-E2). The illuminance of light is adjusted to 4000 lux with an iris diaphragm. The light is incident on an optical element at 45°. A camera (EOS 40D, manufactured by CANON KABUSHIKI KAISHA) with a camera lens (EF 50 mm Compact-Macro Lens, manufactured by CANON KABUSHIKI KAISHA) is arranged in front of the measurement sample. The sample is captured by the camera at a shutter speed of 10 seconds, an F-number of 10, and an ISO speed of 400. The sample is arranged in such a manner that the face where the textured structure formed of the aluminum oxide crystals is formed is directed to the light source.

The resulting images are analyzed by general-purpose image processing software (Photoshop, manufactured by Adobe Systems Incorporated). A 700×700 pixel area is quantified to determine the illuminance.

The degree W of the minute light scattering of the optical member is defined by expression (2):

[Math. 3]

$$W = \frac{W_1}{W_0} \quad (2)$$

where $W_0$ represents the measurement value of the base, and $W_1$ represents the measurement value of the optical member.

The optical member according to aspects of the present invention includes the layer on the surface of the base, the layer mainly containing aluminum oxide and having a textured structure formed of aluminum oxide crystals, in which the layer mainly containing aluminum oxide has a thickness of 240 nm to 1000 nm and a degree of minute light scattering of 6.0 or less. Furthermore, the optical member has a mean reflectivity of 0.21% or less in the wavelength range of 400 nm to 700 nm. Moreover, a layer mainly containing a substance other than aluminum oxide may be provided between the base and the layer mainly containing aluminum oxide.

The surface density of the textured structure of the optical member according to aspects of the present invention is also important. The mean surface roughness Ra', which corresponds to the surface density and is defined by extending the arithmetical mean deviation to a surface, may be 5 nm or more, such as 10 nm or more, and even 15 nm to 100 nm. Furthermore, the surface area ratio Sr may be 1.1 or more, such as 1.15 or more, and even 1.2 to 3.5.

An example of a method for evaluating the resulting fine textured structure is the observation of a surface of the fine textured structure with a scanning probe microscope. The observation shows that the mean surface roughness Ra' defined by extending the arithmetical mean deviation Ra to a plane and the surface area ratio Sr are determined. That is, the mean surface roughness Ra' (nm) is defined by applying and three-dimensionally extending the arithmetical mean deviation Ra, which is defined by JIS B0601, to a measuring surface. The mean surface roughness Ra' is expressed as "the mean value of absolute values of deviations from a reference plane to a specified plane" and represented by expression (3):

[Math. 4]

$$Ra' = \frac{1}{S_0} \int_{Y_B}^{Y_T} \int_{X_L}^{X_R} |F(X,Y) = Z_0| d_X\, d_Y \quad (3)$$

where
Ra': a mean surface roughness (nm),
$S_0$: an area when the measuring surface is assumed to be ideally flat,
F(X, Y): a height at a measurement point (X, Y), wherein X represents an X-coordinate, and Y represents a Y-coordinate,
$X_L$ to $X_R$: the range of the X-coordinates in the measuring surface,
$Y_B$ to $Y_T$: the range of the Y-coordinates in the measuring surface, and
$Z_0$: a mean height in the measuring surface.

The surface area ratio Sr is determined from the expression: Sr=S/$S_0$ (where $S_0$ represents the area when the measuring surface is assumed to be ideally flat; and S represents the actual surface area of the measuring surface). Note that the actual surface area of the measuring surface is determined as follows: First, the surface is divided into small triangles realized by connecting nearest-neighbor three data points (A, B, C) by line segments. Then the area ΔS of each of the small triangles is determined by the vector product: ΔS (ΔABC)= [s(s−AB)(s−BC)(s−AC)]0.5 (where AB, BC, and AC are the lengths of the sides, and s=0.5(AB+BC+AC)). The actual surface area S is determined as the sum of ΔS. Regarding the surface density of the fine textured structure, in the case where Ra' is 5 nm or more and where Sr is 1.1 or more, the textured structure provides the antireflection effect. In the case where Ra' is 10 nm or more and where Sr is 1.15 or more, the antireflection effect is higher than that described above. In the case where Ra' is 15 nm or more and where Sr is 1.2 or more, the antireflection effect reaches a practically usable level. In the case where Ra' is 100 nm or more and where Sr is 3.5 or more, however, a scattering effect resulting from the textured structure is stronger than the antireflection effect. Thus, sufficient antireflection performance cannot be provided.

Figure 5:
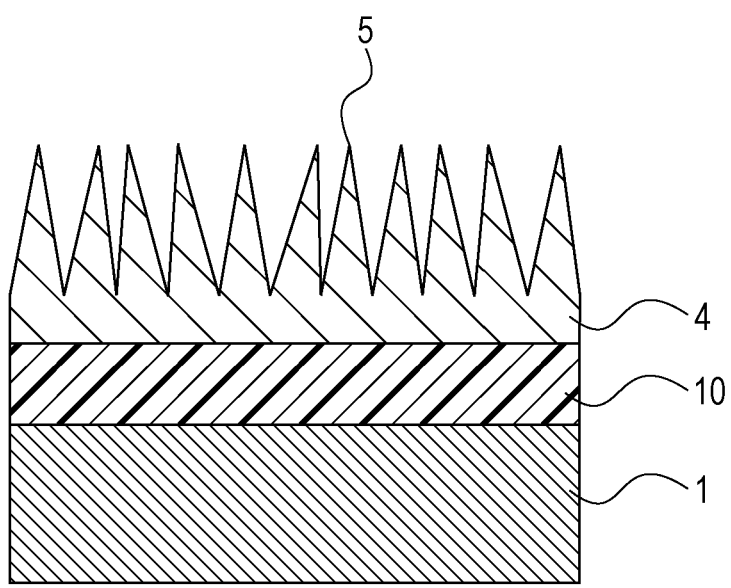
FIG. 5 is a schematic view of an optical member according to an embodiment of the present invention.
Figure 6:
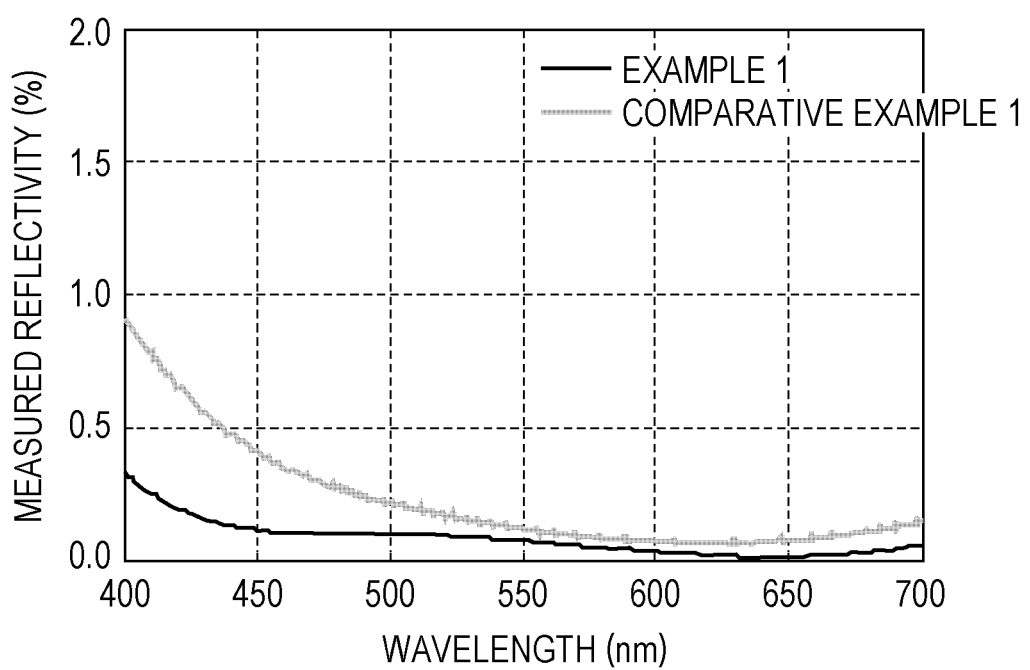
FIG. 6 is a graph showing the relationship between the wavelength (nm) of light and the absolute reflectivity (%) in Example 1 and Comparative Example 1 according to the present invention.

A layer mainly containing a substance other than aluminum oxide may be provided between the base 1 and the layer 4 mainly containing aluminum oxide. FIG. 5 illustrates an example of an optical member in which a layer 10 mainly containing a substance other than aluminum oxide is provided on the base 1 and in which the layer 4 mainly containing aluminum oxide is provided on the layer 10.

The layer 10 mainly containing a substance other than aluminum oxide is arranged in order to mainly adjust the difference in terms of refractive index between the base 1 and the layer 4 mainly containing aluminum oxide. So, the layer 10 mainly containing a substance other than aluminum oxide can be formed of a transparent film composed of an inorganic material or an organic material.

Examples of an inorganic material that can be used for the layer 10 mainly containing a substance other than aluminum oxide include metal oxides, such as $SiO_2$, $TiO_2$, $ZrO_2$, $ZnO$, and $Ta_2O_5$. Examples of a method for forming the layer 10 mainly containing an inorganic material other than aluminum oxide include vacuum film formation methods, such as evaporation and sputtering; and a sol-gel method in which a precursor sol of a metal oxide is applied.

Examples of an organic material that can be used for the layer 10 mainly containing a substance other than aluminum oxide include organic polymers, such as acrylic resins, epoxy resins, oxetane resins, maleimide resins, melamine resins, benzoguanamine resins, phenolic resins, resol resins, polycarbonate, polyester, polyarylate, polyether, polyurea, polyurethane, polyamide, polyamide-imide, polyimide, polyketone, polysulfone, polyphenylene, polyxylylene, and polycycloolefin. An example of a method for forming the layer 10 mainly containing an organic material other than aluminum oxide is wet coating in which a solution containing the organic material is applied.

In addition, the textured structure 5 formed of the aluminum oxide crystals may be subjected to surface treatment to the extent that the antireflection performance is not impaired. To impart abrasion resistance and soil resistance, for example, a $SiO_2$ thin film or an extremely thin layer composed of a fluorinated alkylsilane (FAS) or fluorocarbon resin may be formed.

EXAMPLES

While the present invention will be described in detail below by examples, the present invention is not limited to these examples. Optical members having surfaces with fine textured structures formed in examples and comparative examples were evaluated by methods described below.

(1) Preparation of Precursor Sol 1 to 6 of Aluminum Oxide

First, 14.8 g of aluminum sec-butoxide (ASBD, manufactured by Kawaken Fine Chemicals Co., Ltd.), 0.5 molar equivalents of a stabilizer with respect to aluminum sec-butoxide, and 2-ethylbutanol were mixed and stirred to form a uniform solution. After 0.01 M dilute hydrochloric acid was mixed with a 2-ethylbutanol/1-ethoxy-2-propanol mixed solvent, the resulting solution was slowly added to the aluminum sec-butoxide solution. The mixture was stirred for some time. The solvent was adjusted to finally obtain the 2-ethylbutanol/1-ethoxy-2-propanol (7/3) mixed solvent. The mixture was further stirred in an oil bath with a temperature of 120° C. for 2 to 3 hours or more, thereby preparing precursor sols 1 to 6 of aluminum oxide. Table 1 shows the amounts of the stabilizers and raw materials and the organic aluminum compound contents of the precursor sols of aluminum oxide.

(2) Preparation of $SiO_2$—$TiO_2$ Sol 7

A mixed solvent of 3.15 g of 0.01 M dilute hydrochloric acid [HClaq.] and 17.2 g of 2-propanol was slowly added to 14.6 g of ethyl silicate. The resulting mixture was stirred at room temperature for 6 hours and then was diluted with a mixed solvent of 91.5 g of 4-methyl-2-pentanol and 46.4 g of 2-ethylbutanol, thereby providing solution A. Then 6.7 g of tetra-n-butoxytitanium was dissolved in a mixed solution of 2.6 g of ethyl 3-oxobutanoate and 16.8 g of 4-methyl-2-pentanol. This solution was stirred at room temperature for 3 hours to provide solution B. Solution B was slowly added to solution A under stirring. The resulting mixture was stirred room temperature for another 3 hours, thereby preparing $SiO_2$—$TiO_2$ sol 7 with a Si/Ti molar ratio of 78/22.

(3) Cleaning of Base

A circular glass base, in which one surface was polished and the other surface was frosted, having a diameter of about 30 mm and a thickness of about 1 mm and a 3 cm×3 cm Si base having a thickness of about 1 mm were subjected to ultrasonic cleaning in an alkaline cleaning solution and then dried in an oven.

(4) Measurement of Reflectivity

The reflectivity was measured in the wavelength range of 400 nm to 700 nm at an incident angle of 0° with an absolute-reflectivity measurement device (USPM-RU, manufactured by Olympus Corporation). Evaluation was made on the basis of the mean reflectivity in the measurement range.

(5) Observation of Base Surface

Surfaces of the bases were visually observed. In the case where the nonuniformity of the film was observed, the nonuniformity was categorized as follows:

Nonuniformity 1 of the film: ring-shaped nonuniformity at the peripheral portion of the base; and Nonuniformity 2 of the film: streak-like nonuniformity extending from the center toward the peripheral portion of the base.

(6) Evaluation of Reaction State of Aluminum

As a measurement device, Quantera SXM (manufactured by ULVAC-PHI, Incorporated) was used. A monochromated Al X-ray source was used. The X-ray beam had a diameter of 100 µm. A 500 µm×500 µm area was scanned by the X-ray beam to provide a spectrum. Peaks of C1s, O1s, F1s, and Al2p were selected for analysis. The numbers of integrations were set to 10 for C1s, 3 for O1s, 5 for F1s, and 10 for Al2p. The energy-slit width was set to 140 eV. The energy pitch during measurement was set to 0.125 eV.

The angle between a sample holder and a detector was set to 45°, and the surface of a sample was measured. Furthermore, the angle between the sample holder and the detector was set to 45°, and the surface of the sample was measured.

(7) Measurement of Degree of Minute Light Scattering

A 150-W halogen fiber illuminator (PHL-150C) was used as a light source. Light emitted from the halogen fiber illumination system passed through a rod homogenizer (RHO-13S-E2). The illuminance of light was adjusted to 4000 lux with an iris diaphragm. The light was incident on an optical element at 45°. A camera (EOS 40D, manufactured by CANON KABUSHIKI KAISHA) with a camera lens (EF 50 mm Compact-Macro Lens, manufactured by CANON KABUSHIKI KAISHA) was arranged in front of the measurement sample. The sample was captured by the camera at a shutter speed of 10 seconds, an F-number of 10, and an ISO speed of 400. The sample was arranged in such a manner that the face where the textured structure formed of aluminum oxide boehmite was formed was directed to the light source.

The resulting images were analyzed by general-purpose image processing software (Photoshop, manufactured by Adobe Systems Incorporated). A 700×700 pixel area was quantified to express the illuminance to one decimal place.

The degree W of the minute light scattering of the optical element was defined by expression (2):

[Math. 5]

$$W = \frac{W_1}{W_0} \quad (2)$$

where $W_0$ represents the measurement value of the base, and $W_1$ represents the measurement value of the optical element.

Example 3

The same operation was performed as in Example 1, except that the amorphous aluminum oxide film was formed by the use of the precursor sol 3 of aluminum oxide in place of the precursor sol 1 of aluminum oxide.

In each of Examples 1 to 3, the reflectivity was measured. The results demonstrated that the optical films made from the precursor sols of aluminum oxide according to aspects of the present invention have low mean reflectivities. Furthermore, the nonuniformity of the film due to aggregation was not observed.

Example 4

An appropriate amount of precursor sol 1 of aluminum oxide was dropped onto the Si base that had been subjected to cleaning in the foregoing manner. Spin coating was per-

TABLE 1

| Sol | Stabilizer | $R_1$ | $R_2$ | $R_3$ | Amount of stabilizer (g) | Amount of stabilizer (molar equivalent)* | 2-Ethylbutanol (g) | 1-Ethoxy-2-propanol (g) | Amount of aluminum alkoxide (% by weight)* | Catalytic water (molar equivalent)* |
|---|---|---|---|---|---|---|---|---|---|---|
| precursor sol 1 of aluminum oxide | 3-methyl-2,4-pentanedione | —$CH_3$ | —$CH_3$ | —$CH_3$ | 3.4 | 0.5 | 41.6 | 17.8 | 18.7 | 1.5 |
| precursor sol 2 of aluminum oxide | 3-ethyl-2,4-pentanedione | —$CH_3$ | —$CH_3$ | —$C_2H_5$ | 3.8 | 0.5 | 42.5 | 18.2 | 18.3 | 1.5 |
| precursor sol 3 of aluminum oxide | 3-butyl-2,4-pentanedione | —$CH_3$ | —$CH_3$ | —$C_2H_5$ | 4.3 | 0.5 | 43.5 | 18.6 | 17.8 | 1.5 |
| precursor sol 4 of aluminum oxide | ethyl 3-oxobutanoate | —O—$C_2H_5$ | —$CH_3$ | —H | 3.9 | 0.5 | 42.7 | 18.3 | 18.2 | 1.5 |
| precursor sol 5 of aluminum oxide | trifluoroacetylacetone | —$CF_3$ | —$CH_3$ | —H | 4.6 | 0.5 | 44.3 | 19.0 | 17.5 | 1.5 |
| precursor sol 6 of aluminum oxide | tert-butyl acetoacetate | —O—C—$(CH_3)_3$ | —$CH_3$ | —H | 4.7 | 0.5 | 44.5 | 19.1 | 17.4 | 1.5 |

(Note 1)
*"Amount of stabilizer (molar amount)" represents the molar equivalent of the stabilizer with respect to aluminum sec-butoxide.
(Note 2)
*"Amount of aluminum alkoxide (% by weight)" represents the percent by weight of aluminum sec-butoxide serving as a raw material with respect to the precursor sol of aluminum oxide.
(Note 3)
*"Catalytic water (molar equivalent) represents the molar equivalent of catalytic water with respect to aluminum sec-butoxide.

Example 1

An appropriate amount of $SiO_2$—$TiO_2$ sol 7 was dropped onto a flat glass plate (S-LAH55, n=1.83 at 550 nm) that had been subjected to cleaning in the foregoing manner. Spin coating was performed at 3000 rpm for 20 seconds. The glass base was baked at 200° C. for 12 hours in a circulating hot air oven, thereby producing a flat glass plate with a $SiO_2$—$TiO_2$ layer.

An appropriate amount of precursor sol 1 of aluminum oxide was dropped onto the flat glass plate with a $SiO_2$—$TiO_2$ layer. Spin coating was performed at 3500 rpm for 20 seconds. The glass base was baked at 140° C. for 2 hours in the circulating hot air oven, thereby forming an amorphous aluminum oxide film.

The aluminum oxide film was immersed in hot water with a temperature of 75° C. for 20 minutes and then dried at 60° C. for 20 minutes.

Example 2

The same operation was performed as in Example 1, except that the amorphous aluminum oxide film was formed by the use of the precursor sol 2 of aluminum oxide in place of the precursor sol 1 of aluminum oxide.

formed at 3500 rpm for 20 seconds. The Si base was baked at 140° C. for 2 hours in a circulating hot air oven, thereby forming an amorphous aluminum oxide film. The aluminum oxide film was immersed in hot water with a temperature of 75° C. for 20 minutes and then dried at 60° C. for 20 minutes.

Example 5

An appropriate amount of precursor sol 1 of aluminum oxide was dropped onto the Si base that had been subjected to cleaning in the foregoing manner. Spin coating was performed at 3500 rpm for 20 seconds. The Si base was baked at 200° C. for 2 hours in a circulating hot air oven, thereby forming an amorphous aluminum oxide film. The aluminum oxide film was immersed in hot water with a temperature of 75° C. for 20 minutes and then dried at 60° C. for 20 minutes.

In each of Examples 4 and 5, the surface of the sample was analyzed by X-ray photoelectron spectroscopy at a photoelectron take-off angle of 45°. Table 3 shows the results. Next, in each of Examples 4 and 5, the surface of the sample was analyzed by XPS at a photoelectron take-off angle of 75°. Table 4 shows the results. Furthermore, the values of X, Y, and Y−X were determined from these results, and the mean reflectivities and the appearance were evaluated. Table 5 shows the results.

Letting the number of aluminum atoms obtained by analyzing the surface of the sample using X-ray photoelectron spectroscopy at a photoelectron take-off angle of 45° be 1, X represents the ratio of the number of oxygen atoms to the number of aluminum atoms, i.e., O/Al.

Letting the number of aluminum atoms obtained by analyzing the surface of the sample using X-ray photoelectron spectroscopy at a photoelectron take-off angle of 75° be 1, Y represents the ratio of the number of oxygen atoms to the number of aluminum atoms, i.e., O/Al.

For each of the optical films made from the precursor sols of aluminum oxide according to aspects of the present invention, the difference between Y and X was small. This indicated a small difference in terms of the crystal state of aluminum oxide between the surface portion and the inner portion of the textured structure, a satisfactory reaction state, and the excellent uniformity of the film. Furthermore, X measured at a photoelectron take-off angle of 45° was larger than 2. This demonstrated that the surface portion of the textured structure had a small refractive index. Moreover, the mean reflectivity was low, and the nonuniformity of the film due to aggregation was not observed.

Comparative Example 1

The same operation was performed as in Example 1, except that the amorphous aluminum oxide film was formed by the use of the precursor sol 4 of aluminum oxide in place of the precursor sol 1 of aluminum oxide.

Comparative Example 2

The same operation was performed as in Example 1, except that the amorphous aluminum oxide film was formed by the use of the precursor sol 5 of aluminum oxide in place of the precursor sol 1 of aluminum oxide.

Comparative Example 3

The same operation was performed as in Example 1, except that the amorphous aluminum oxide film was formed by the use of the precursor sol 6 of aluminum oxide in place of the precursor sol 1 of aluminum oxide.

In each of Comparative Examples 1 to 3, the reflectivity was measured. The results demonstrated that it is difficult to achieve satisfactory antireflection performance comparable to that of the optical film according to aspects of the present invention under the same baking conditions. Furthermore, when the precursor sol of aluminum oxide was spin-coated on the flat glass plate, nonuniformity 1 of the film formed in Comparative Examples 1 and nonuniformity 2 of the film formed in Comparative Examples 2 were observed.

Comparative Example 4

The same operation was performed as in Example 4, except that the amorphous aluminum oxide film was formed by the use of the precursor sol 4 of aluminum oxide in place of the precursor sol 1 of aluminum oxide.

Comparative Example 5

The same operation was performed as in Example 5, except that the amorphous aluminum oxide film was formed by the use of the precursor sol 4 of aluminum oxide in place of the precursor sol 1 of aluminum oxide.

In each of Comparative Examples 4 and 5, the elementary analysis of the surface portion was performed by XPS analysis. Table 3 shows the results. Next, in each of Comparative Examples 4 and 5, the elementary analysis of the inner portion was performed by XPS analysis. Table 4 shows the results. Furthermore, the values of X, Y, and Y−X were determined from these results, and the mean reflectivities and the appearance were evaluated. Table 5 shows the results.

Letting the number of aluminum atoms obtained by analyzing the surface of the sample using X-ray photoelectron spectroscopy at a photoelectron take-off angle of 45° be 1, X represents the ratio of the number of oxygen atoms to the number of aluminum atoms, i.e., O/Al.

Letting the number of aluminum atoms obtained by analyzing the surface of the sample using X-ray photoelectron spectroscopy at a photoelectron take-off angle of 75° be 1, Y represents the ratio of the number of oxygen atoms to the number of aluminum atoms, i.e., O/Al.

The results demonstrated that in each of Comparative Examples 4 and 5, the structural difference between the surface portion and the inner portion was large and the surface portion of the structure had a high refractive index. The results also demonstrated that it is difficult to achieve satisfactory antireflection performance comparable to that of the optical film according to aspects of the present invention under the same baking conditions. Furthermore, when the precursor sol of aluminum oxide was spin-coated on the flat glass plate, nonuniformity 1 of the film was observed.

TABLE 2

|  | Sol | Stabilizer | Film-formation temperature (° C.) | Mean reflectivity (%)* | Surface observation |
|---|---|---|---|---|---|
| Example 1 | precursor sol 1 of aluminum oxide | 3-methyl-2,4-pentanedione | 140 | 0.09 | no nonuniformity of film |
| Example 2 | precursor sol 2 of aluminum oxide | 3-ethyl-2,4-pentanedione | 140 | 0.11 | no nonuniformity of film |
| Example 3 | precursor sol 3 of aluminum oxide | 3-butyl-2,4-pentanedione | 140 | 0.12 | no nonuniformity of film |
| Comparative Example 1 | precursor sol 4 of aluminum oxide | ethyl 3-oxobutanoate | 140 | 0.23 | nonuniformity 1 of film |
| Comparative Example 2 | precursor sol 5 of aluminum oxide | trifluoroacetylacetone | 140 | 0.83 | nonuniformity 2 of film |
| Comparative Example 3 | precursor sol 6 of aluminum oxide | tert-butyl acetoacetate | 140 | 0.30 | nonuniformity 1 of film |

(Note 4)
*"Mean reflectivity (%)" represents the mean reflectivity in the wavelength range of 400 nm to 700 nm at an incident angle of 0°.

TABLE 3

| | Sol | Stabilizer | Film-formation temperature (° C.) | Composition | | | | O/Al → X |
| --- | --- | --- | --- | --- | --- | --- | --- | --- |
| | | | | C1s | O1s | F1s | Al2p | |
| Example 4 | precursor sol 1 of aluminum oxide | 3-methyl-2,4-pentanedione | 140 | 2.32 | 68.62 | 0.32 | 28.74 | 2.39 |
| Example 5 | precursor sol 1 of aluminum oxide | 3-methyl-2,4-pentanedione | 200 | 2.47 | 68.77 | 0.23 | 28.52 | 2.41 |
| Comparative Example 4 | precursor sol 4 of aluminum oxide | ethyl 3-oxobutanoate | 140 | 2.97 | 62.37 | 0.06 | 34.60 | 1.80 |
| Comparative Example 5 | precursor sol 4 of aluminum oxide | ethyl 3-oxobutanoate | 200 | 3.29 | 63.18 | 0.07 | 33.46 | 1.89 |

TABLE 4

| | Sol | Stabilizer | Film-formation temperature (° C.) | Composition | | | | O/Al → Y |
| --- | --- | --- | --- | --- | --- | --- | --- | --- |
| | | | | C1s | O1s | F1s | Al2p | |
| Example 4 | precursor sol 1 of aluminum oxide | 3-methyl-2,4-pentanedione | 140 | 2.17 | 70.55 | 0.35 | 26.93 | 2.62 |
| Example 5 | precursor sol 1 of aluminum oxide | 3-methyl-2,4-pentanedione | 200 | 2.24 | 70.86 | 0.49 | 26.41 | 2.68 |
| Comparative Example 4 | precursor sol 4 of aluminum oxide | ethyl 3-oxobutanoate | 140 | 2.63 | 68.90 | 0.25 | 28.22 | 2.41 |
| Comparative Example 5 | precursor sol 4 of aluminum oxide | ethyl 3-oxobutanoate | 200 | 3.16 | 69.16 | 0.49 | 27.20 | 2.54 |

TABLE 5

| | Sol | Stabilizer | Film formation temperature (° C.) | X | Y | Y − X | Mean reflectivity | Surface observation |
| --- | --- | --- | --- | --- | --- | --- | --- | --- |
| Example 4 | precursor sol 1 of aluminum oxide | 3-methyl-2,4-pentanedione | 140 | 2.39 | 2.62 | 0.23 | 0.09 | no nonuniformity of film |
| Example 5 | precursor sol 1 of aluminum oxide | 3-methyl-2,4-pentanedione | 200 | 2.41 | 2.68 | 0.27 | 0.10 | no nonuniformity of film |
| Comparative Example 4 | precursor sol 4 of aluminum oxide | ethyl 3-oxobutanoate | 140 | 1.80 | 2.41 | 0.61 | 0.23 | nonuniformity 1 of film |
| Comparative Example 5 | precursor sol 4 of aluminum oxide | ethyl 3-oxobutanoate | 200 | 1.89 | 2.54 | 0.65 | 0.12 | nonuniformity 1 of film |

Example 6

An appropriate amount of precursor sol 1 of aluminum oxide was dropped onto a flat glass plate (L-BAL 42, n=1.58 at 550 nm) that had been subjected to cleaning in the foregoing manner. Spin coating was performed for 20 seconds. The glass base was baked for 30 minutes in a circulating hot air oven, thereby forming an amorphous aluminum oxide film. Table 6 shows the number of revolutions during spin coating and the film-formation temperature during baking in the circulating hot air oven.

The aluminum oxide film was immersed in hot water with a temperature of 75° C. for 20 minutes and then dried at 60° C. for 20 minutes.

Example 7

The same operation was performed as in Example 6, except that the amorphous aluminum oxide film was formed by the use of the precursor sol 2 of aluminum oxide in place of the precursor sol 1 of aluminum oxide at the number of revolutions during spin coating and the film-formation temperature during baking in the circulating hot air oven shown in Table 6.

Example 8

The same operation was performed as in Example 6, except that the amorphous aluminum oxide film was formed at the number of revolutions during spin coating and the film-formation temperature during baking in the circulating hot air oven shown in Table 6.

Example 9

The same operation was performed as in Example 6, except that the amorphous aluminum oxide film was formed by the use of the precursor sol 2 of aluminum oxide in place of the precursor sol 1 of aluminum oxide at the number of revolutions during spin coating and the film-formation temperature during baking in the circulating hot air oven shown in Table 6.

Example 10

The same operation was performed as in Example 6, except that the amorphous aluminum oxide film was formed at the number of revolutions during spin coating and the film-formation temperature during baking in the circulating hot air oven shown in Table 6.

Example 11

The same operation was performed as in Example 6, except that the amorphous aluminum oxide film was formed by the use of the precursor sol 2 of aluminum oxide in place of the precursor sol 1 of aluminum oxide at the number of revolutions during spin coating and the film-formation temperature during baking in the circulating hot air oven shown in Table 6.

The reflectivity was measured. The results demonstrated that the optical films of the optical members according to aspects of the present invention have low mean reflectivities and low degrees of minute light scattering. Furthermore, the nonuniformity of the film due to insufficient baking was not observed.

Comparative Example 6

The same operation was performed as in Example 6, except that the amorphous aluminum oxide film was formed by the use of the precursor sol 6 of aluminum oxide in place of the precursor sol 1 of aluminum oxide at the number of revolutions during spin coating and the film-formation temperature during baking in the circulating hot air oven shown in Table 6.

In the case of using precursor sol 6 of aluminum oxide, it was difficult to achieve high antireflection performance unless the film-formation temperature was 180° C. or higher. Furthermore, in the case of a film-formation temperature of 180° C., the degree of minute light scattering was degraded. because of the poor coatability of the precursor sol of aluminum oxide. Furthermore, the results also demonstrated that even if the optical member was subjected to high-temperature baking treatment, the organic aluminum compound was not sufficiently removed, so that the optical member did not have performance comparable to that of the optical member produced in each of Examples 4 and 5.

The results in each of Examples 6 to 11 demonstrated that the optical member according to aspects of the present invention has a low degree of minute light scattering and high antireflection performance without causing the nonuniformity of the film even at a low film-formation temperature. Meanwhile, for the precursor sol of aluminum oxide used in Comparative Example 6, a low film-formation temperature resulted in the nonuniformity of the film due to insufficient baking, thus providing the optical member having poor antireflection performance. So, the film-formation temperature should be increased. However, the degree of minute light scattering of the optical member formed even at a high film-formation temperature was higher than that of the optical member according to aspects of the present invention.

The optical member produced according to aspects of the present invention is usable on a transparent base with any

TABLE 6

| | Sol | Number of rotations (rpm) | Film-formation temperature (° C.) | Mean reflectivity (%)* | Surface observation | Degree of minute light scattering* |
|---|---|---|---|---|---|---|
| Example 6 | precursor sol 1 of aluminum oxide | 2500 | 120 | 0.16 | no nonuniformity of film | 4.14 |
| Example 7 | precursor sol 2 of aluminum oxide | 2000 | 120 | 0.12 | no nonuniformity of film | 3.44 |
| Example 8 | precursor sol 1 of aluminum oxide | 2500 | 160 | 0.21 | no nonuniformity of film | 5.31 |
| Example 9 | precursor sol 2 of aluminum oxide | 2000 | 160 | 0.12 | no nonuniformity of film | 3.87 |
| Example 10 | precursor sol 1 of aluminum oxide | 2500 | 180 | 0.21 | no nonuniformity of film | 5.04 |
| Example 11 | precursor sol 2 of aluminum oxide | 2000 | 180 | 0.12 | no nonuniformity of film | 4.33 |
| Comparative Example 6 | precursor sol 6 of aluminum oxide | 3000 | 180 | 0.22 | no nonuniformity of film | 6.93 |

(Note 5)
*"Mean reflectivity (%)" represents the mean reflectivity in the wavelength range of 400 nm to 700 nm at an incident angle of 0°.
(Note 6)
*"Degree of minute light scattering" represents the value measured by the predetermined method.

Evaluation of Performance

The results in Examples 1 to 3 demonstrated that precursor sols 1 to 3 of aluminum oxide containing the organic aluminum compounds with specific structures have the effect of reducing the reflectivity and the effect of inhibiting the nonuniformity of the films due to the aggregation of the organic aluminum compounds. Meanwhile, in Comparative Examples 1 to 3, the precursor sols of aluminum oxide had poor coatability, thus providing the optical films having low antireflection performance.

The results in each of Examples 4 and 5 demonstrated that the crystal structure of the optical member produced by the use of precursor sol 1 of aluminum oxide containing the organic aluminum compound with specific structure has the effect of reducing the reflectivity and the effect of inhibiting the nonuniformity of the film due to the aggregation of the organic aluminum compound. Meanwhile, the results in Comparative Examples 4 and 5 demonstrated that with respect to the optical member produced by the use of precursor sol 4 of aluminum oxide that does not have a specific structure, the optical film had low antireflection performance refractive index, provides excellent antireflection performance, and has a long-term weather resistance. Thus, examples of a member for which the optical member according to the present invention can be used include various displays of word processors, computers, television sets, and plasma display panels; optical members, such as polarizer of liquid crystal displays, sunglass lenses, graduated eyeglass lenses, finder lenses for cameras, prisms, fly-eye lenses, toric lenses, various optical filters, and sensors formed of various optical glass materials and transparent plastics; imaging optical systems, observation optical systems such as binoculars, and projection optical systems for use in liquid crystal projectors using those optical members; various optical lenses of scan optical systems for use in laser printers; and optical members, such as covers of various instruments and window glasses of automobiles and electric trains.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-107704 filed May 7, 2010 and No. 2011-054420 filed Mar. 11, 2011, which are hereby incorporated by reference herein in their entirety.

What is claimed is:

1. A precursor sol of aluminum oxide comprising:
    a polycondensate formed by the hydrolysis of an aluminum alkoxide or an aluminum salt;
    a solvent; and
    an organic aluminum compound of general formula (1):

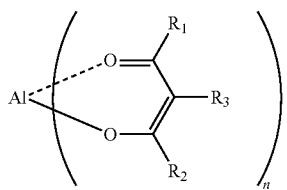

general formula (1)

wherein $R_1$ and $R_2$ each represent an alkyl group having 1 to 6 carbon atoms, a perfluoroalkyl group, or an allyl group; $R_3$ represents an alkyl group having 1 to 6 carbon atoms, a perfluoroalkyl group, an allyl group, or an aryl group; and n represents an integer of 1 to 3.

2. The precursor sol of aluminum oxide according to claim 1, wherein the solvent is a monohydric alcohol having 5 to 8 carbon atoms.

3. The precursor sol of aluminum oxide according to claim 1, further comprising:
    an acid or a base.

4. A method for producing an optical member, comprising the steps of:
    (a) feeding a precursor sol of aluminum oxide according to claim 1 onto at least one surface of a base;
    (b) spreading the precursor sol of aluminum oxide on the base;
    (c) drying and/or baking the base to form an aluminum oxide film; and
    (d) immersing the aluminum oxide film in hot water with a temperature of 60° C. to 100° C. to form a textured structure made of aluminum oxide crystals.

* * * * *